(12) United States Patent
Bonestroo et al.

(10) Patent No.: US 11,778,976 B2
(45) Date of Patent: Oct. 10, 2023

(54) AUTOMATIC MILKING SYSTEM AND A METHOD OF DETERMINING A HEALTH CONDITION OF AN ANIMAL

(71) Applicant: DELAVAL HOLDING AB, Tumba (SE)

(72) Inventors: John Bonestroo, Tumba (SE); Ilka Klaas, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/764,712

(22) PCT Filed: Sep. 29, 2020

(86) PCT No.: PCT/SE2020/050913
§ 371 (c)(1),
(2) Date: Mar. 29, 2022

(87) PCT Pub. No.: WO2021/066712
PCT Pub. Date: Apr. 8, 2021

(65) Prior Publication Data
US 2022/0330512 A1  Oct. 20, 2022

(30) Foreign Application Priority Data

Sep. 30, 2019 (SE) .................... 1951106-2

(51) Int. Cl.
*A01J 5/007* (2006.01)
*A01J 5/013* (2006.01)
(52) U.S. Cl.
CPC ............. *A01J 5/0132* (2013.01); *A01J 5/007* (2013.01); *A01J 5/0133* (2013.01)
(58) Field of Classification Search
CPC ........ A01J 5/0132; A01J 5/007; A01J 5/0133; A01J 5/013
See application file for complete search history.

(56) References Cited

U.S. PATENT DOCUMENTS

| 5,568,788 A | 10/1996 | Van Den Berg et al. |
| 9,232,764 B2 * | 1/2016 | Axelson ................ A01J 5/0132 |

(Continued)

FOREIGN PATENT DOCUMENTS

| EP | 0534565 | 3/1993 |
| EP | 3196644 | 7/2017 |

(Continued)

OTHER PUBLICATIONS

International Search Report for PCT/SE2020/050913 dated Dec. 10, 2020, 5 pages.

(Continued)

*Primary Examiner* — Joshua D Huson
*Assistant Examiner* — Spencer T Callaway
(74) *Attorney, Agent, or Firm* — NIXON & VANDERHYE

(57) ABSTRACT

An automatic milking system including an electronic control unit, a milking station, a production milk tank, a second milk tank, an animal identification system, a first sensor to measure at least one indicator of illness of an animal, a data memory in which measurements are gathered. The control unit configured to register a first point of time at which milk from an animal is diverted to the second tank instead of being conducted to the production milk tank, register a second point of time at which milk from the animal is shifted from being conducted to the second tank to being conducted to the production milk tank, and, when the time period between the first point of time and the second point of time is within a predetermined number days, the control unit determines that the animal is in an illness state.

23 Claims, 4 Drawing Sheets

(56) References Cited

U.S. PATENT DOCUMENTS

| | | | |
|---|---|---|---|
| 2011/0247563 A1 | 10/2011 | Schrader et al. | |
| 2012/0006270 A1 | 1/2012 | Bosma | |
| 2012/0118236 A1* | 5/2012 | Van Der Tol | A01J 5/013 119/14.08 |
| 2018/0077894 A1 | 3/2018 | Moshier et al. | |

FOREIGN PATENT DOCUMENTS

| | | |
|---|---|---|
| JP | H11-56147 | 3/1999 |
| SE | 522430 | 2/2004 |
| WO | 2010/074559 | 7/2010 |
| WO | 2012/080275 | 6/2012 |
| WO | 2015/170970 | 11/2015 |
| WO | 2019/182497 | 9/2019 |

OTHER PUBLICATIONS

Written Opinion of the ISA for PCT/SE2020/050913 dated Dec. 10, 2020, 7 pages.
Swedish Search Report for SE1951106-2 dated Sep. 30, 2019, 3 pages.

* cited by examiner

AUTOMATIC MILKING SYSTEM AND A METHOD OF DETERMINING A HEALTH CONDITION OF AN ANIMAL

This application is the U.S. national phase of International Application No. PCT/SE2020/050913 filed Sep. 29, 2020 which designated the U.S. and claims priority to SE 1951106-2 filed Sep. 30, 2019, the entire contents of each of which are hereby incorporated by reference.

TECHNICAL FIELD

The present invention relates to an automatic milking system comprising: a control system comprising an electronic control unit, at least one milking station configured to milk animals, a production milk tank for receiving milk from the milking station, a second milk tank configured to receive milk diverted from the milking station and not conducted to the production milk tank, an animal identification system connected to the control unit, configured to provide the control unit with individual identification information of animals milked in the automatic milking system, at least one first sensor configured to measure at least one indicator of illness of an animal.

The automatic milking system may be a conventional system, including manual attachment of teat cups to the teats of animals to be milked, or robot systems in which a robot automatically attaches the teat cups to the teats of animals to be milked. The sensor or sensors for measuring an illness indicator may be arranged in the milk line from the milking station to the production tank. In particular in the case of a robot system there may be provided a separate sensor in connection to each teat cup.

The present invention also relates to a method of determining a health condition of an animal milked in an automatic milking system.

BACKGROUND

In connection to industrial milking of cows in dairy farms, it frequently occurs that the cows are subject to mastitis, either clinical or sub-clinical. Early detection of illness of animals, in particular mastitis, may be achieved by means of univariate or multivariate analysis of measured values of different milk characteristics. Upon detection of indications of mastitis, the farmer often has to further study the milk or the animal in question in order to determine if it is mastitis and if it is clinical or subclinical mastitis. If the mastitis is clinical mastitis, antibiotics should be administered to the animal and the milk of the animal must be diverted from the production milk for a number of days as counted from the day of administration of the antibiotics.

After treatment of an animal with antibiotics, it is of interest to know if the animal has recovered or not (chronical mastitis). A control system may be used for establishing whether an individual animal in a heard has or has had an illness, such as mastitis, in particular clinical mastitis, and to determine the health of the animal a certain time after that the mastitis, or other illness, has been detected. It is an object of the invention to suggest such a control system.

SUMMARY

The object of the invention is achieved by means of an automatic milking system comprising
a control system comprising an electronic control unit,
at least one milking station configured to milk animals,
a production milk tank for receiving milk from the milking station,
a second milk tank configured to receive milk diverted milk from the milking station and not conducted to the production milk tank,
an animal identification system connected to the control unit, configured to provide the control unit with individual identification information of animals milked in the automatic milking system,
at least one first sensor configured to measure at least one indicator of illness of an animal, said sensor being connected to the control unit,
a data memory in which measurements performed by the first sensor on milk from individual animals identified by the identification system are gathered, wherein the time of each measurement is also registered and saved in the memory, the automatic milking system being characterized in that the control unit is configured to
register a first point of time at which milk from an animal is diverted to the second tank instead of being conducted to the production milk tank, and,
provided that the milk of the animal has been diverted from milking station to the second milk tank for a plurality of consecutive milking sessions after the first point of time, register a second point of time at which milk from the animal is shifted from being conducted to the second tank to being conducted to the production milk tank, and
if the time period between the first point of time and the second point of time is within a predetermined number days, the control unit is configured to determine that the animal is in an illness state between the first point of time and the second point of time.

The first point of time may be triggered by a registration of an administration of antibiotics to the animal. The administration may have been decided by and performed by a human or decided by the electronic control unit and performed either by a human or by a device for automatic administration of antibiotics to the animal, said device being controlled by the electronic control device. The identification system typically comprises tags arranged at each animal and a tag reader arranged at the milking station and connected to the electric control unit.

The second tank should be interpreted broadly and may be a tank connected directly to the milking station or be a separate bucket or be a drain line for diverted milk.

According to one embodiment, the time period between the first point of time and the second point of time is 2-10 days. According to another embodiment said period of time is 5-10 days. A shorter time period may be indicative of a less severe illness state, while a longer time period may be indicative of a more severe illness state. The control unit may be configured to determine different illness state depending on the length of said time period.

According to one embodiment, the control unit is configured to determine a health condition of the animal on basis of repeated measurements by the first sensor from said second point of time up to a predetermined third point of time. Preferably, the measurements are performed at each separate milking session. The results are gathered in the data memory.

According to one embodiment, the control unit is configured to determine a state of recovery from the illness state of the animal at the third point of time.

According to one embodiment, the control unit is configured to determine the state of recovery from the illness state when the measured values from the first sensor has stabilized within a predetermined range between the second point of time and the third point of time. When somatic cell number is determined by means of the first sensor, the upper limit of the range may be 25% above the "normal" somatic cell number of the animal in question before any indication of illness has been established. The "normal" somatic cell number is a cell number given by one or more previous historical measurements of the somatic cell number of the animal, saved in the data memory. The inventors have found that the third point of time, at which stabilsation should occur as a sign of recovery, is 3-4 weeks from the first point of time.

According to one embodiment, the first sensor is a sensor configured to measure electric conductivity of milk or a sensor configured to directly or indirectly determine the numbers of somatic cells in the milk of the animal.

According to one embodiment, the control unit is configured to compare previously stored data with the measurements received from the first sensor, and the control unit is configured to determine the health condition of the animal on basis of said comparison. Previously stored data may be the results of previous corresponding measurements on the animal in question, for example in connection to a previous illness state of that animal, or previous corresponding measurements on other animals of a herd. The data is stored in the memory of the control system.

According to one embodiment, the automatic milking system is characterized in that it comprises a plurality of further sensors for measuring a plurality of parameters other than or in addition to the illness indicator measured by the first sensor, and which further sensors are connected to the control unit, and that the control unit is configured to perform a mathematical analysis of the measured parameters and on basis thereof determine an illness-indicating index indicative of illness on basis of input from said further sensors and from said first sensor, and to generate an alert if said index exceeds a threshold value, and that the control unit is configured to determine the health condition of the animal on basis of repeated measurements by the first sensor from said second point of time up to a predetermined third point of time if the first point of time is within a predetermined time period from a point in time of generation of said alert for the animal. The further sensors may be configured to measure one or more of the following parameters: milk yield, blood lactate, dehydrogenase (LDH), activity, or body condition score. The mathematical analysis performed by the control unit 1 may be multivariate analysis on the measured results from the further sensors.

According to one embodiment, the control unit is configured to set the first point of time on basis of the point of time of generation of the alert.

According to one embodiment, the control unit is configured to set the second point of time on basis of the point of time of generation of the alert. The third point of time may also be set on basis of the alert and, according to one embodiment, it is 3-4 weeks after alert.

According to one embodiment, the first point of time coincides with the point of time of generation of the alert.

According to one embodiment, the milking system is characterized in that it comprises a device for administration of antibiotics to an animal, which device is connected to the control unit, and that the control unit is configured to order an administration of antibiotics to an animal within a predetermined time from the time of generation of an alert for the animal. The device for administration may be a device similar to the one disclosed in US 2019/0008117.

According to one embodiment, the indicator of illness is an indicator of mastitis.

According to one embodiment, the indicator of illness is an indicator of clinical mastitis.

According to one embodiment, the milking system is characterized in that, if the time period between the first point of time and the second point of time is within a first predetermined number of days, preferably 5-10 days, for which an illness state is determined, the control unit is configured to determine that an administration of antibiotics to the animal has occurred.

According to one embodiment, the milking system is characterized in that, if the time period between the first point of time and the second point of time is within a second predetermined number of days, preferably 2-4 days, for which and illness state is determined, the control unit is configured to determine that an administration of antibiotics to the animal has not occurred.

The object of the invention is also achieved with a method of determining a health condition of an animal in a an automatic milking system comprising a control system comprising an electronic control unit, at least one milking station configured to milk animals, a production milk tank for receiving milk from the milking station, a second milk tank configured to receive milk diverted milk from the milking station and not conducted to the production milk tank, an animal identification system connected to the control unit, configured to provide the control unit with individual identification information of animals milked in the automatic milking system, at least one first sensor configured to measure at least one indicator of illness of an animal, said sensor being connected to the control unit, a data memory in which measurements performed by the first sensor on milk from individual animals identified by the identification system are gathered, wherein the time of each measurement is also registered and saved in the memory, the method being characterized in that it comprises the steps of registering a first point of time at which milk from an animal is diverted to the second tank instead of being conducted to the production milk tank, and, provided that the milk of the animal has been diverted from milking station to the second milk tank for a plurality of consecutive milking sessions after the first point of time, register a second point of time at which milk from the animal is shifted from being conducted to the second tank to being conducted to the production milk tank, and if the time period between the first point of time and the second point of time is within a predetermined number of days, determining by means of the control unit that the animal is in an illness state between the first point of time and the second point of time.

According to one embodiment, the method comprises the step of performing a mathematical analysis by means of the electric control unit in order to determine a state of recovery from the illness state of the animal at the third point of time.

According to one embodiment, the method comprises the step of determining a state of recovery from the illness state if the measured values from the first sensor has stabilized within a predetermined range between the second point of time and the third point of time.

According to one embodiment, the method comprises the steps of
storing data received from the sensor in the memory and comparing previously stored such data with the measurements received from the sensor and determining by means of the control unit the health condition of the animal on basis of said comparison.

According to one embodiment, the method comprises measuring a plurality of parameters other than or in addition to the illness indicator measured by the first sensor, and to perform a mathematical analysis of the measured parameters and on basis thereof determine an illness-indicating index indicative of illness of an animal on basis of said measurements, and to generate an alert if said index exceeds a threshold value,
and determine the health condition of the animal on basis of repeated measurements by the first sensor from said second point of time up to a predetermined third point of time if the first point of time is within a predetermined period of time from a point of time of generation of said alert for the animal.

According to one embodiment, the method comprises the step of setting the first point of time on basis of the time of generation of the alert.

According to one embodiment, the method comprises the step of setting the second point of time on basis of the time of generation of the alert.

According to one embodiment, the method comprises the step of administering antibiotics to an animal within a predetermined time from the time of generation of an alert for the animal.

DETAILED DESCRIPTION

Figure 1:
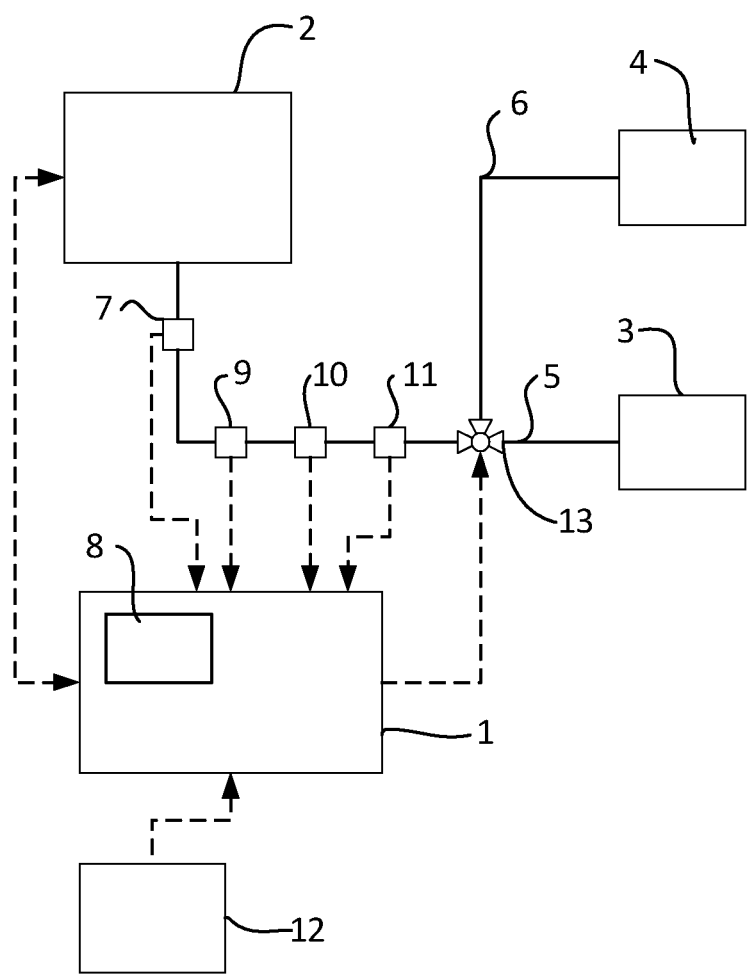
FIG. 1 is schematic representation of an automatic milking system according to the invention.

FIG. 1 shows an automatic milking system comprising a control system comprising an electronic control unit 1, a milking station 2 configured to milk animals, a production milk tank 3 for receiving milk from the milking station, and a second milk tank 4 configured to receive milk diverted milk from the milking station 2 and not conducted to the production milk tank 3. The production milk tank 3 is connected to milking station 2 via a production milk line 5, and the second milk tank 4 is connected to the milking station via a second milk line 6.

The system also comprises an animal identification system (not shown) connected to the control unit 1, configured to provide the control unit 1 with individual identification information of animals milked in the automatic milking system. The identification system typically comprises identification tags attached to the respective animal.

The milking system also comprises at least one first sensor 7 configured to measure at least one indicator of illness of an animal, said sensor 7 being connected to the control unit 1. The first sensor 7 is arranged in the production milk line 5. Alternatively the first sensor 7 is arranged in a by-pass line from the milk production line 5. According to one embodiment, the first sensor 7 is a sensor able of measuring the electric conductivity of milk. According to another embodiment the first sensor 7 is a sensor able of detecting the number of somatic cells in the milk. The milking system also comprises a data memory 8 in which measurements performed by the first sensor 7 on milk from individual animals identified by the identification system are gathered. The time of each measurement is also registered and saved in the memory, such that a time-log is created in the memory.

The milking system also comprises a plurality of further sensors, indicated 9, 10, 11, for measuring a plurality of parameters other than or in addition to the illness indicator measured by the first sensor 7. The further sensors 9, 10, 11 are connected to the control unit 1, and that the control unit 1 is configured to perform a mathematical analysis of the measured parameters of the further sensors 9, 10, 11 and on basis thereof determine an illness-indicating index indicative of illness on basis of input from said further sensors and from said first sensor, and to generate an alert if said index exceeds a threshold value. The further sensors may be configured to measure one or more of the following parameters: milk yield, blood lactate, dehydrogenase (LDH). The further sensors may also, alternatively include sensor for measuring activity or body condition score. The mathematical analysis performed by the control unit 1 may be multivariate analysis on the measured results from the further sensors 9, 10, 11.

The milking system also comprises a device 12 for administration of antibiotics to an animal, which device is connected to the control unit 1, and that the control unit 1 is configured to control the operation of the administration device 12.

Figure 2:
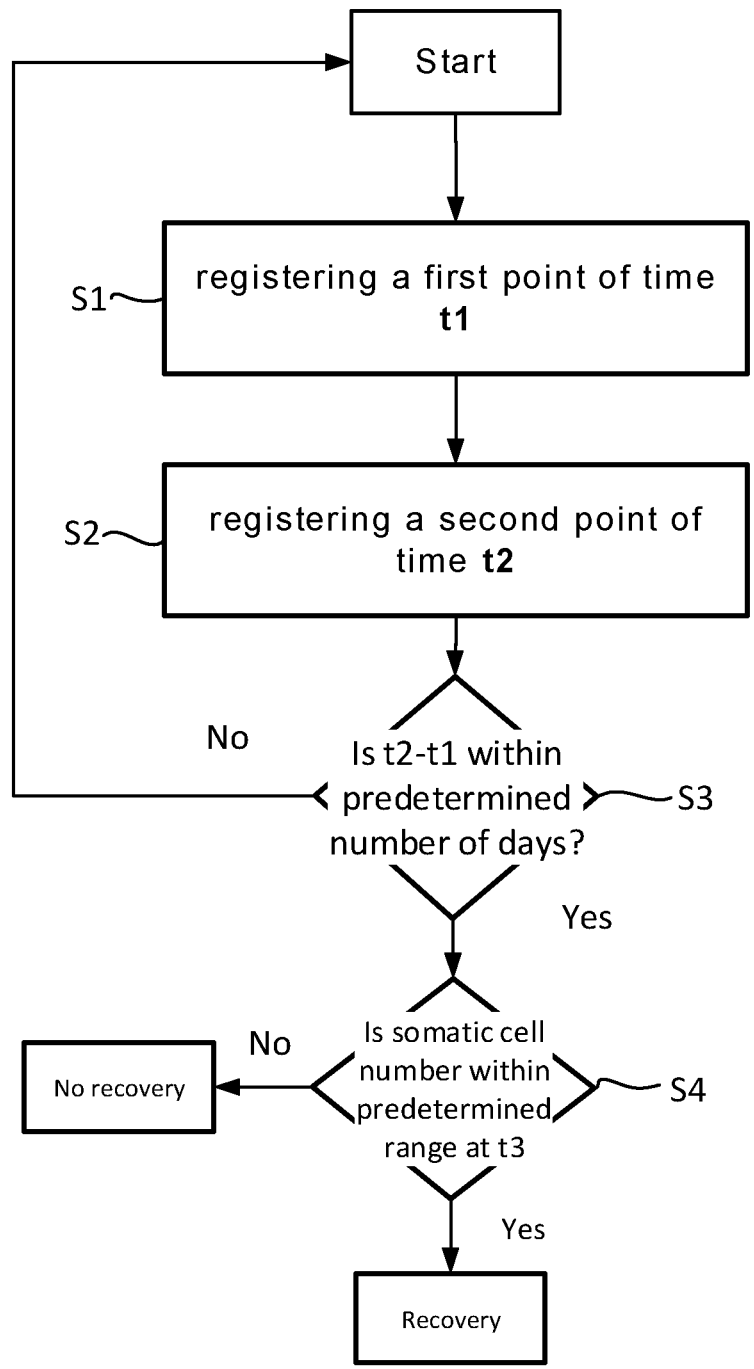
FIG. 2 is a flow chart showing a first embodiment of the method of the invention.

FIG. 2 shows a flow chart in which method steps, performed through the action of the automatic milking system of the invention are performed. The following steps are performed:

S1: registering the first point of time t1 and diverting milk of the animal from the milking station 2 to the second milk tank 4 instead of to the production milk tank, starting from the first point of time t1.

S2: register a second point of time t2 at which milk from the animal is shifted from being conducted to the second tank to being conducted to the production milk tank. The second point of time t2 is registered provided that the milk of the animal has been diverted from milking station for a plurality of consecutive milking sessions after the first point of time t1.

S3: determining if the animal has been or is in an illness state: if the time period between the first point of time t1 and the second point of time t2 is within a predetermined number days, the control unit is configured to determine that the animal is or has been in an illness state.

Figure 5:
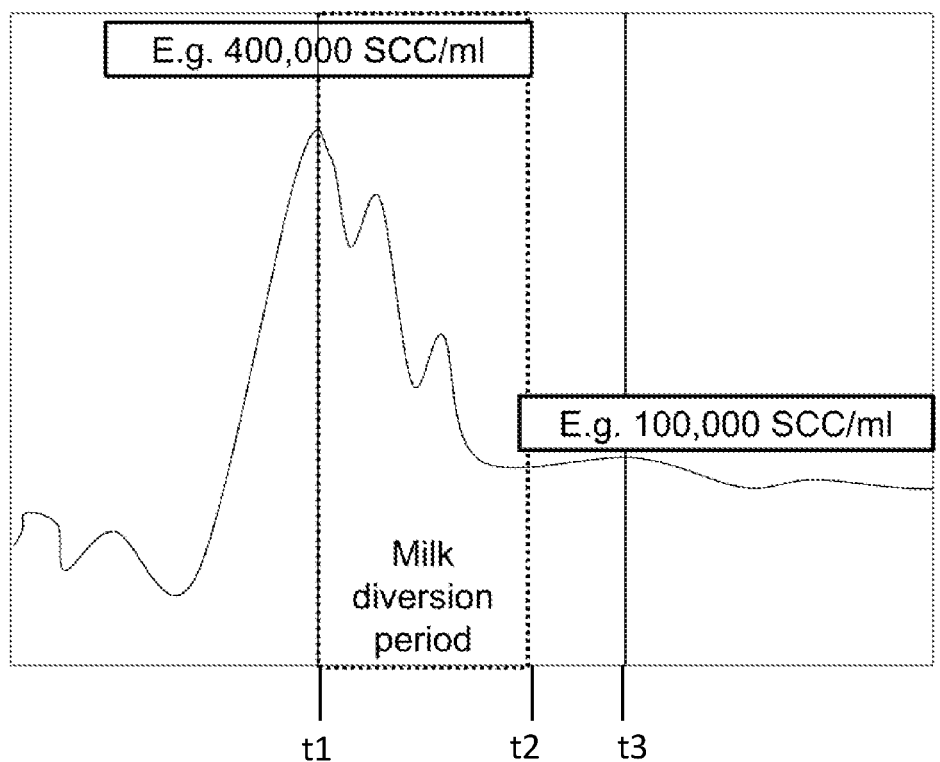
FIG. 5 is a diagram showing somatic cell number/ml versus time for a case in which recovery is determined.

S4: performing a mathematical analysis by means of the electric control unit in order to determine a state of recovery from the illness state of the animal at the third point of time t3. The step comprises determining a state of recovery from the illness state. Recovery is assumed to have occurred if the measured values from the first sensor has stabilized within a predetermined range between the second point of time and the third point of time. The first sensor is a sensor configured to measure electric conductivity of milk or a sensor configured to directly or indirectly determine the numbers of somatic cells in the milk of the animal. FIG. 5 is a diagram showing somatic cell number/ml versus time for a case in which recovery is determined.

Figure 3:
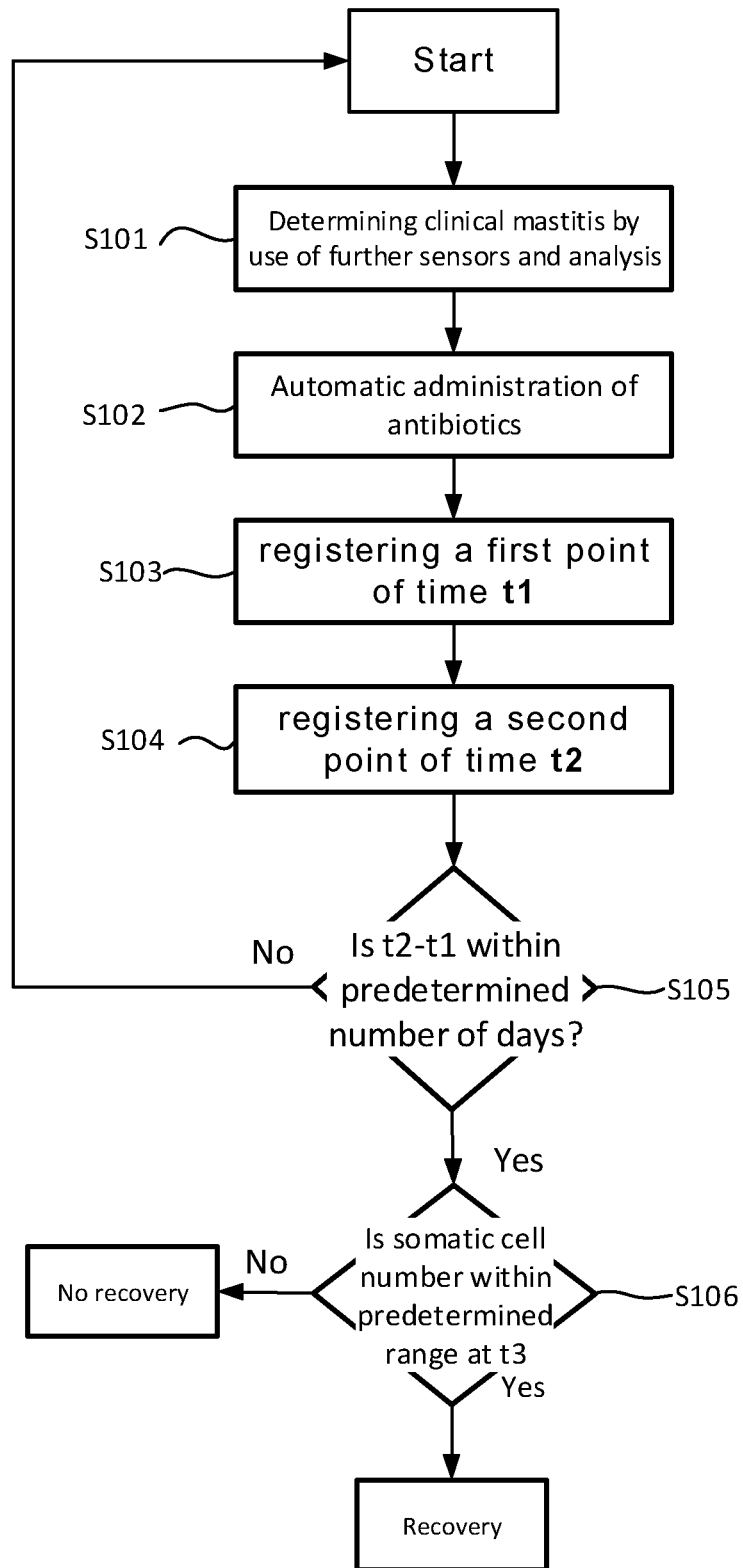
FIG. 3 is a flow chart showing a second embodiment of the method of the invention.

FIG. 3 shows another embodiment of the method, comprising the following steps

S101: determining, by means of the control unit 1, on the basis of the measurements of the further sensors 9, 10, 11, and by applying a multivariate analysis on the obtained values, that a predetermined animal has a clinical mastitis.

S102: administering antibiotics to the animal by means of the administration device 12 upon order from the control unit 1.

S103: registering the first point of time t1 at which, order from the control unit 1, milk of the animal is diverted from the milking station 2 to the second milk tank 4 instead of being conducted to the production milk tank 3. The control unit 1 is configured to control the diversion of milk to the second milk tank 4, for example by controlling a valve 13 via which the second milk line 6 diverts from the production milk line 5 (see FIG. 1).

S104: determining and registering a second point of time t2 at which milk from the animal is shifted from being conducted to the second tank 4 to being conducted to the production milk tank 3. The second point of time t2 is registered provided that the milk of the animal has been diverted from milking station for a plurality of consecutive milking sessions after the first point of time t1.

S105: determining if the animal has been or is in an illness state: if the time period between the first point of time and the second point of time is within a predetermined number days, preferably 5-10 days, the control unit 1 is configured to determine that the animal is or has been in an illness state.

S106: performing a mathematical analysis by means of the electric control unit in order to determine a state of recovery from the illness state of the animal at the third point of time t3. The step comprises determining a state of recovery from the illness state. Recovery is assumed to have occurred if the measured values from the first sensor has stabilized within a predetermined range between the second point of time and the third point of time. The first sensor is a sensor configured to measure electric conductivity of milk or a sensor configured to directly or indirectly determine the numbers of somatic cells in the milk of the animal. FIG. 5 is a diagram showing somatic cell number/ml versus time for a case in which recovery is determined. The somatic cell number after recovery may be up to approximately 20-25% higher than before alert.

Figure 4:
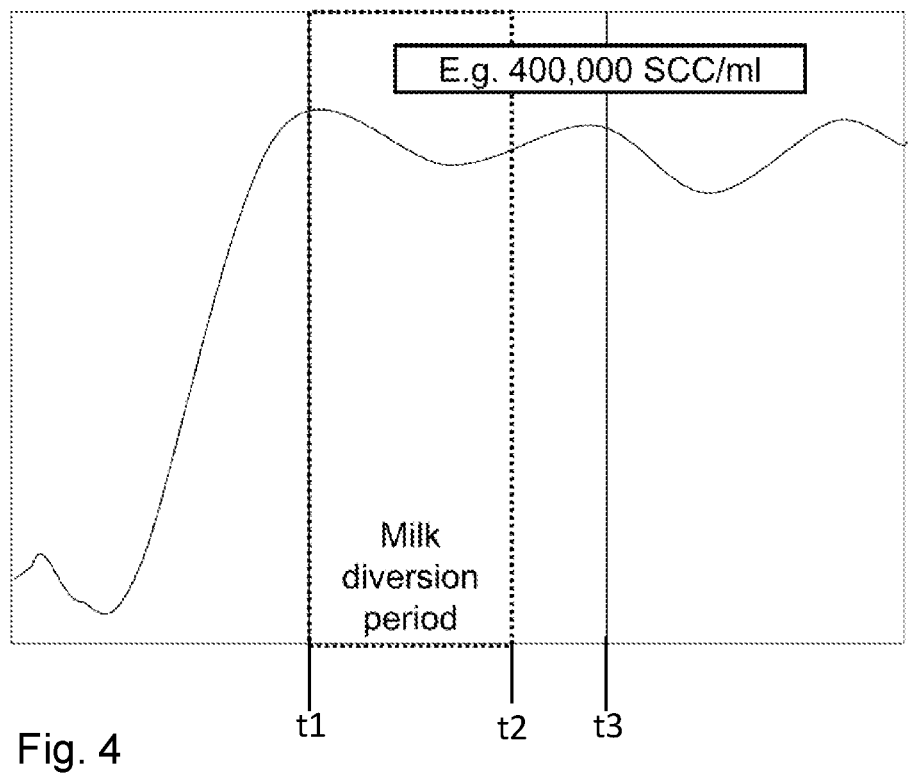
FIG. 4 is a diagram showing somatic cell number/ml versus time for a case in which non-recovery is determined.

Recovery is assumed not to have occurred if the somatic cell number, or the electric conductivity, of the milk has not stabilized within the predetermined range. FIG. 4 shows an example in which the somatic cell number at the third point of time t3 is at the same high level as at the first point of time t1. It has been observed by the inventors that, if recovery occurs at all, recovery occurs within 3-4 weeks from the first point of time for illnesses that cows are subjected to, especially illnesses as mastitis, and irrespective of administration of antibiotics or other treatments. If no recovery is seen after 3-4 weeks, there is high probability that the illness is chronical.

The invention claimed is:

1. An automatic milking system comprising:
a control system comprising an electronic control unit (1),
at least one milking station (2) configured to milk animals,
a production milk tank (3) for receiving milk from the milking station (2),
a second milk tank (4) configured to receive milk diverted from the milking station (2) and not conducted to the production milk tank (3),
an animal identification system connected to the electronic control unit (1), the animal identification system configured to provide the electronic control unit (1) with individual identification information of animals milked by the automatic milking system,
at least one first sensor (7) configured to measure at least one indicator of illness of an animal, said at least one first sensor being connected to the electronic control unit (1),
a data memory (8) in which measurements performed by the at least one first sensor (7) on milk from individual animals identified by the animal identification system are gathered, wherein the time of each measurement is also registered and saved in the data memory (8), wherein,
the electronic control unit (1) is configured to
register a first point of time (t1) at which milk from an animal is diverted to the second milk tank instead of being conducted to the production milk tank (3), and,
provided that the milk of the animal has been diverted from the milking station (2) to the second milk tank (4) for a plurality of consecutive milking sessions after the first point of time (t1), register a second point of time (t2) at which milk from the animal is shifted from being conducted to the second milk tank to being conducted to the production milk tank (3), and
when the time period between the first point of time (t1) and the second point of time (t2) is within a predetermined number days, the electronic control unit (1) is configured to determine that the animal was in an illness state between the first point of time (t1) and the second point of time (t2).

2. The automatic milking system according to claim 1, wherein the electronic control unit (1) is configured to determine a health condition of the animal on basis of repeated measurements by the at least one first sensor (7) from said second point of time (t2) up to a predetermined third point of time (t3).

3. The automatic milking system according to claim 2, wherein the electronic control unit (1) is configured to determine a state of recovery from the illness state of the animal at the predetermined third point of time (t3).

4. The automatic milking system according to claim 3, wherein the electronic control unit (1) is configured to determine the state of recovery from the illness state when measured values from the at least one first sensor (7) has stabilized within a predetermined range between the second point of time (t2) and the predetermined third point of time (t3).

5. The automatic milking system according to claim 1, wherein the at least one first sensor (7) is a sensor configured to measure electric conductivity of milk or a sensor configured to directly or indirectly determine the numbers of somatic cells in the milk of the animal.

6. The automatic milking system according to claim 1, wherein the electronic control unit (1) is configured to compare previously stored data with the measurements received from the at least one first sensor (7), and the electronic control unit (1) is configured to determine a health condition of the animal on basis of said comparison.

7. The automatic milking system according to claim 1, further comprising a plurality of further sensors (9, 10, 11) for measuring a plurality of parameters other than or in addition to the indicator of illness measured by the at least one first sensor (7), and which further sensors (9, 10, 11) are connected to the electronic control unit (1), and the electronic control unit (1) is configured to perform a mathematical analysis of the parameters once measured, and on basis thereof determine an illness-indicating index indicative of illness on basis of input from said further sensors (9, 10, 11) and from said at least one first sensor (7), and to generate an alert when said illness-indicating index exceeds a threshold value, and wherein the electronic control unit (1) is configured to determine a health condition of the animal on basis of repeated measurements by the at least one first sensor (7) from said second point of time (t2) up to a predetermined third point of time (t3) when the first point of time (t1) is within a predetermined time period from a point of time of generation of said alert for the animal.

8. The automatic milking system according to claim 7, wherein the electronic control unit (1) is configured to set the first point of time (t1) on basis of the point of time of generation of the alert.

9. The automatic milking system according to claim 7, wherein the electronic control unit (1) is configured to set the second point of time (t2) on basis of the point of time of generation of the alert.

10. The automatic milking system according to claim 7, further comprising a device (12) for administration of antibiotics to an animal, wherein the device (12) is connected to the electronic control unit (1), and wherein the electronic control unit (1) is configured to order an administration of antibiotics to an animal within a predetermined time from the time of generation of an alert for the animal.

11. The automatic milking system according to claim 1, wherein the indicator of illness is an indicator of mastitis.

12. The automatic milking system according to claim 11, wherein the indicator of illness is an indicator of clinical mastitis.

13. The automatic milking system according to claim 1, wherein, when the time period between the first point of time (t1) and the second point of time (t2) is within a first predetermined number of days for which an illness state is determined, the electronic control unit (1) is configured to determine that an administration of antibiotics to the animal has occurred.

14. The automatic milking system according to claim 13, wherein, when the time period between the first point of time (t1) and the second point of time (t2) is within a second predetermined number of days for which an illness state is determined, the electronic control unit (1) is configured to determine that an administration of antibiotics to the animal has not occurred.

15. A method of determining a health condition of an animal in an automatic milking system comprising
a control system comprising an electronic control unit (1),
at least one milking station (2) configured to milk animals,
a production milk tank (3) for receiving milk from the milking station (2),
a second milk tank (4) configured to receive milk diverted from the milking station (2) and not conducted to the production milk tank (3),
an animal identification system connected to the electronic control unit (1), configured to provide the electronic control unit (1) with individual identification information of animals milked in the automatic milking system,
at least one first sensor (7) configured to measure at least one indicator of illness of an animal, said at least one first sensor being connected to the electronic control unit (1), a data memory (8) in which measurements performed by the at least one first sensor (7) on milk from individual animals identified by the animal identification system are gathered, wherein the time of each measurement is also registered and saved in the data memory (8), the method comprising steps of:

registering a first point of time (t1) at which milk from an animal is diverted to the second milk tank instead of being conducted to the production milk tank (3), and, provided that the milk of the animal has been diverted from the milking station (2) to the second milk tank (4) for a plurality of consecutive milking sessions after the first point of time (t1), register a second point of time (t2) at which milk from the animal is shifted from being conducted to the second milk tank to being conducted to the production milk tank (3), and when the time period between the first point of time (t1) and the second point of time (t2) is within a predetermined number of days, the electronic control unit (1) determining that the animal is in an illness state between the first point of time (t1) and the second point of time (t2).

16. The method according to claim 15, further comprising a step of the electronic control unit (1) performing a mathematical analysis in order to determine a state of recovery from the illness state of the animal at a predetermined third point of time (t3) after said second point of time (t2).

17. The method according to claim 16, further comprising a step of determining a state of recovery from the illness state when the measured values from the at least one first sensor (7) has stabilized within a predetermined range between the second point of time (t2) and the predetermined third point of time (t3).

18. The method according to claim 15, wherein the at least one first sensor (7) is a sensor configured to measure electric conductivity of milk or a sensor configured to directly or indirectly determine the numbers of somatic cells in the milk of the animal.

19. The method according to claim 16, further comprising steps of :
storing data received from the at least one first sensor in the data memory (8), and
comparing previously stored such data with the measurements received from the at least one first sensor and the electronic control unit (1) determining the health condition of the animal on basis of said comparison.

20. The method according to claim 16, further comprising:
measuring a plurality of parameters other than or in addition to the indicator of illness measured by the at least one first sensor (7), and to perform a mathematical analysis of the measured parameters and on basis thereof determine an illness-indicating index indicative of illness of an animal on basis of said measurements, and to generate an alert when said illness-indicating index exceeds a threshold value, and
determining the health condition of the animal on basis of repeated measurements by the at least one first sensor (7) from said second point of time (t2) up to a predetermined third point of time (t3) when the first point of time (t1) is within a predetermined period of time from a point of time of generation of said alert for the animal.

21. The method according to claim 20, further comprising a step of setting the first point of time (t1) on basis of the time of generation of the alert.

22. The method according to claim 20, further comprising a step of setting the second point of time ($t2$) on basis of the time of generation of the alert.

23. The method according to claim 20, further comprising a step of administering antibiotics to an animal within a predetermined time from the time of generation of an alert for the animal.

\* \* \* \* \*